US008554958B1

(12) United States Patent
Weiser et al.

(10) Patent No.: US 8,554,958 B1
(45) Date of Patent: Oct. 8, 2013

(54) SMART PRINTER CARTRIDGE

(75) Inventors: William B. Weiser, Meridian, ID (US); Mark D. Montierth, Meridian, ID (US)

(73) Assignee: Marvell International Ltd. (BM)

( * ) Notice: Subject to any disclaimer, the term of this patent is extended or adjusted under 35 U.S.C. 154(b) by 0 days.

(21) Appl. No.: 13/427,478

(22) Filed: Mar. 22, 2012

Related U.S. Application Data

(63) Continuation of application No. 12/137,103, filed on Jun. 11, 2008, now Pat. No. 8,161,199.

(60) Provisional application No. 60/946,039, filed on Jun. 25, 2007.

(51) Int. Cl.
*G06F 3/00* (2006.01)
*G06F 12/00* (2006.01)

(52) U.S. Cl.
USPC .................................................. 710/8; 347/19

(58) Field of Classification Search
USPC .................................................. 710/8
See application file for complete search history.

(56) References Cited

U.S. PATENT DOCUMENTS 5,017,966 A 5/1991 Suga
5,574,832 A 11/1996 Towery et al.
5,610,635 A * 3/1997 Murray et al. .................... 347/7
5,684,518 A 11/1997 Nobel et al.
5,712,669 A 1/1998 Swanson et al.
5,930,553 A 7/1999 Hirst et al.
6,027,199 A 2/2000 Reed
6,039,430 A * 3/2000 Helterline et al. .............. 347/19
6,128,448 A 10/2000 Arcaro et al.
6,141,513 A 10/2000 Nishiuwatoko et al.
6,243,116 B1 6/2001 Kotaki et al.
6,494,630 B2 12/2002 Williams et al.
6,530,648 B2 3/2003 Leu et al.
6,631,967 B1 * 10/2003 Saruta ............................ 347/19
6,655,779 B2 12/2003 Usui et al.
6,665,092 B2 12/2003 Reed
6,719,197 B2 4/2004 Yajima
6,783,231 B1 8/2004 Kim
7,020,419 B2 3/2006 Tsuruya et al.
7,043,166 B2 * 5/2006 Parry et al. ...................... 399/12
7,320,126 B2 1/2008 Chang et al.
7,343,298 B2 3/2008 Asauchi et al.
7,424,398 B2 9/2008 Booth et al.
7,443,547 B2 10/2008 Moreno et al.
7,483,163 B2 1/2009 Tsukada
7,489,417 B2 2/2009 Tran et al.
7,547,092 B2 6/2009 Silverbrook
7,548,938 B2 6/2009 Minami
7,603,499 B2 10/2009 Kealy et al.
7,613,857 B2 11/2009 Kealy et al.
7,716,499 B2 5/2010 Kobayashi
7,738,123 B2 6/2010 Burgoyne et al.
7,864,352 B2 * 1/2011 Hull et al. .................... 358/1.15
7,904,895 B1 3/2011 Cassapakis et al.

(Continued)

*Primary Examiner* — Henry Tsai
*Assistant Examiner* — Titus Wong

(57) ABSTRACT

A system and method are disclosed for modifying the capabilities and functions of a printer after it is manufactured. A consumable/replaceable printer cartridge includes a storage device having updated and/or additional printer function data and other data for use by the printer control circuitry to execute printer functions and other types of functions. In addition, when the printer cartridge is installed in the printer the storage device may be utilized by the printer control circuitry as expanded memory for use in executing the updated and/or additional printer functions and other types of functions.

20 Claims, 3 Drawing Sheets

(56) References Cited

U.S. PATENT DOCUMENTS

| | | | | |
|---|---|---|---|---|
| 7,934,092 | B2 * | 4/2011 | Funk et al. | 713/166 |
| 2003/0123887 | A1 * | 7/2003 | Imes et al. | 399/24 |
| 2004/0263589 | A1 | 12/2004 | Ansier et al. | |
| 2005/0262497 | A1 | 11/2005 | Ternasky et al. | |
| 2005/0270345 | A1 | 12/2005 | Katsuyama et al. | |
| 2005/0275815 | A1 * | 12/2005 | Silverbrook | 355/18 |

* cited by examiner

SMART PRINTER CARTRIDGE

RELATED APPLICATION

This application is a continuation of U.S. patent application Ser. No. 12/137,103, filed Jun. 11, 2008, which is hereby incorporated by reference in its entirety. This application claims the benefit of U.S. Provisional Application No. 60/946,039, filed on Jun. 25, 2007, which is incorporated herein by reference.

BACKGROUND

1. Technical Field

The present disclosure relates to the field of computer printers, and more particularly to modifying embedded printer function data in the after-market.

2. Related Art

Computer printers have printer control circuitry for processing print data and print commands and for executing print functions. Printer control circuitry is often implemented as a system that is embedded in the printer. The embedded system usually includes a processor and a storage device (memory) that is preprogrammed with printer function data implemented as firmware at the time the printer is manufactured. Manufacturing costs of printers are kept low by installing the minimum (or near minimum) amount of memory needed to implement and support the printer's firmware. As such, the extent to which printer firmware can be modified is limited by the amount of memory installed at the time of manufacture.

The embedded firmware determines the functions, features, capabilities, and limitations of the printer. The firmware enables the printer to communicate with a host device, organize data received from a host device, and execute print instructions. Print instructions may include font data, page format and margin data, and image data, as examples. The firmware also determines the control signals to communicate to the print assembly for printing. Once the printer leaves the manufacturer, changes to the functions, features, capabilities, and limitations of the printer are considerably limited because the amount of firmware memory is unchangeable. For the most part, consumers do not have the option to modify the printer firmware in ways that relate to the functions, features, and capabilities of the printer. An improved approach is desirable.

BRIEF SUMMARY

The following embodiments relate to systems and methods for modifying the functions, features, and capabilities of a printer after it is manufactured. A consumable/replaceable printer cartridge includes a storage device that is accessible by the printer when the printer cartridge is installed. The storage device may have modified printer function data and/or other data for use by the printer control circuitry to execute printer functions and other types of functions not enabled by the original printer firmware. In addition, when the printer cartridge is installed in the printer the storage device may be utilized by the printer control circuitry as expanded memory for use in executing the modified printer functions and other types of functions.

A feature of the embodiments is that printer firmware updates, new features, performance enhancements, advertisements and other useful presentation information may be associated with replacement printer cartridges. Associating different updates/features/etc. or combinations thereof with different grades of replacement printer cartridges may provide a consumer with the choice between a high grade cartridge and a lower grade, less expensive (or free) cartridge. As an example, the retail price of a printer cartridge may be lowered/offset through advertisement fees paid by a company to have its advertisement data included in the storage device of a printer cartridge.

In a preferred embodiment, a printer cartridge includes a data storage device configured to store data that may be used to modify and/or supplement printer function data embedded in a printer. The printer cartridge also includes an interface to communicate the stored data between the data storage device and the printer. The stored data may be used to enable the printer to execute a function not supported by the printer function data prior to modification. The function may be associated with image printing. The stored data may be used to increase printer resolution and/or to upgrade the capabilities of the printer. In a version, the data storage device is configured to function as a memory device for image resolution processing by a printer control circuit. The stored data may include data for use in printing a first advertisement page, determining an interval for printing a second advertisement page, and/or displaying an advertisement page on a display. The data storage device may include audio data, video data, and/or audio/video data. The data storage device may include data for disabling at least one printing feature if the printer cartridge is refilled. At least one printing feature may be high resolution printing, as an example. The stored data may be used to modify the printer function data to allow a user to select an image file stored in the data storage device for printing. The printer cartridge may be selected from a group consisting of an ink cartridge and a toner cartridge. The data storage device may be a non-volatile memory that includes at least one gigabyte of NAND flash memory. The interface may be an universal serial bus (USB) bi-directional two-pin interface, as an example.

According to another embodiment, a printer cartridge has means for executing one or more of the following functions: communicating data from a printer cartridge to a printer, modifying printer function data in the printer based on the communicated data, enabling a printer to execute a function not supported by printer function data prior to modification, increasing printer resolution, printing a first advertisement page, determining an interval for printing a second advertisement page, displaying an advertisement page on a display, (disabling at least one printing feature if the printer cartridge is refilled, printing an image based on the communicated data, and/or modifying the printer function data to upgrade the capabilities of the printer.

A method includes communicating data from a printer cartridge to a printer, and modifying printer function data in the printer based on the communicated data. Modifying the printer function data may include enabling the printer to execute a function not supported by the printer function data prior to modification. The printer function data may be modified to increase printer resolution, to print a first advertisement page, to determine an interval for printing a second advertisement page, to display an advertisement page on a display, and/or to disable at least one printing feature if the printer cartridge is refilled. The method may also include printing an image based on the communicated data. The printer function data may be modified to upgrade the capabilities of the printer.

A computer readable storage medium has processor executable instructions to communicate data from a printer cartridge to a printer, wherein the data includes processor executable instructions to modify printer function data in the printer. Instructions for modifying the printer function data in the printer may include instructions to enable the printer to execute a function not supported by the printer function data prior to modification, increase printer resolution, print a first advertisement page, determine an interval for printing a second advertisement page, display an advertisement page on a display, disable at least one printing feature if the printer cartridge is refilled, print an image based on the communicated data, and/or modify the printer function data to upgrade the capabilities of the printer.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The preferred embodiments will now be described with reference to the attached drawings.

DETAILED DESCRIPTION OF THE PRESENTLY PREFERRED EMBODIMENTS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

The embodiments below relate to a printer cartridge (sometimes referred to as a "smart printer cartridge") having a storage device that includes printer function data for use by a printer control circuit, such as an embedded printer formatter application specific integrated circuit (ASIC) or other printer circuit. The printer function data may include any type of data, such as advertisement data for printing or displaying advertisements, promotional data, program data, file data, or formatter data, as examples. Formatter data may include data for expanding the functionality of the printer, such as for improving graphics. The memory provided by the printer cartridge storage device may also be used by the printer control circuit to improve graphics (such as to increase processing resolution) and for other functions. Advertisement data may include third party advertisements. Fees paid by third parties for the advertisements may be used to offset the manufacturing cost of the printer cartridge and/or the printer. On the consumer side, different grades of printer cartridges may be offered to consumers. Each grade may be related to a level and type of functionality added to the printer by the printer cartridge. Features and performance characteristics of a printer may be associated with printer cartridges and not just the printer. This adds value to recurring printer cartridge sales in the after-market and may reduce the cost of the printer.

Figure 1:
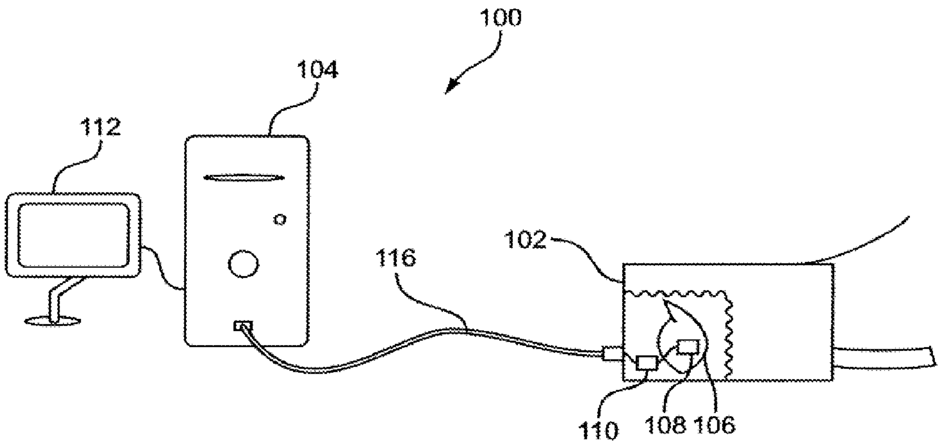
FIG. 1 is an illustration of a system that includes a consumable printer cartridge having a storage device that includes printer function data for use by the printer control circuitry of a printer, according to an embodiment.

FIG. 1 is an illustration of a system 100 that includes a printer 102 and a host 104. The printer 102 may be a laser printer, an inkjet printer, or any type of printer that receives a consumable printer cartridge 106, such as an ink cartridge or toner cartridge, as examples. The consumable printer cartridge 106 (hereinafter "printer cartridge") is any replaceable printer cartridge having a print substance, such as liquid ink or powered toner, that depletes with printer use over time. The printer cartridge 106 may be replaced when the print substance is substantially depleted or at any time. The host 104 may be a personal computer or any type of device that communicates with the printer 102.

The printer cartridge 106 includes a storage device 108 having printer function data for communication to or use by the printer control circuitry 110. The printer control circuitry 110 is configured to receive data from the storage device 108 and/or to communicate data to the storage device 108. Data communicated from the storage device 108 to the printer control circuitry 110 may include data for modifying the printer's firmware to modify and/or add print functions and/or modify or add other features. Such modifications may include improvements to print quality, graphics processing, or any other feature of the printer, including adding new features. In addition, when the printer cartridge 106 is installed in the printer 102, the memory added by the storage device 108 may be utilized by the printer control circuitry 110 to perform the modified and/or additional printer functions and other types of functions and/or to provide an increase in print resolution (i.e., print quality). Thus, the printer cartridge 106 may provide programmed data and/or add memory to the printer control circuitry 110.

In an embodiment, the storage device 108 includes data for adding files, features, and/or functions to the printer 102 that are not provided by the printer control circuitry 110. The files, features, and/or functions may be considered as associated with the printer cartridge 106 rather than the printer 102. Different printer cartridges 106 supporting different file, feature, and/or function combinations may be made available for a printer model. When replacing a printer cartridge 106, a consumer may select a printer cartridge model based on the files, features, and/or functions offered by different models.

As an example, the storage device 108 may include printer function data that enables the printer 102 to print fonts and graphics not supported by the original firmware of the printer control circuitry 110. The printer function data is made available to the printer control circuitry 110 when the printer cartridge 106 is installed in the printer 102. The printer control circuitry 110 reads the printer function data from the storage device 108 and modifies its firmware so that it supports the previously unsupported fonts and graphic styles. In this regard, the printer function data may be considered a source for upgrading the capabilities of the printer 102.

The storage device 108 may also include other types of data. The storage device 108 may include image data for printing images and/or for displaying images on a display 112. The storage device 108 may include one or more image files associated with a theme, a topic, or a category, as examples. The image files may be selected by a user through the host 104 for printing or display. In a version, the image files include advertisement images that are printed by the printer 102 or displayed by the display 112 at predetermined intervals. For example, one or more advertisement pages may be automatically printed once every fifty print jobs, or automatically displayed once a month. Other types of advertisements that may be pre-programmed in the storage device 108 include audio, video, and audio/video files ("media files"). Media and image files read from the storage device 108 by the printer control circuitry 110 may be communicated to the host 104 through a wired connection 116 or a wireless connection (not shown).

The storage device 108 may also be used to record the serial number of the printer cartridge 106 and/or usage data, such as the total number of pages printed since the printer cartridge 106 was installed. Printer features may be enabled and/or disabled based on the usage data. For example, higher resolution printing may be enabled while the printer cartridge 106 is at least 75% full, and disabled otherwise. If a cartridge is refilled (instead of replaced) certain print features may be automatically modified or disabled (in accord with storage device 108 programmed instructions) to account for the mechanical degradation and corresponding print quality limitations of the reused printer cartridge 106. For example, higher resolution printing may be disabled when the usage data indicates that cartridge parts are likely worn.

Firmware of the printer control circuitry 110 may be modified so that the storage device 108 is utilized as an operational component of the printer control circuitry 110. The storage device 108 may be utilized by the printer control circuitry 110 as additional buffer memory, for example, to enable higher image resolution print file processing.

The storage device 108 may be mounted on or in (or connected in any other way) the printer cartridge 106 such that a connection is made between contacts on the storage device 108 and contacts in the printer 102 when the printer cartridge 106 is installed in the printer 102. The interface may be, a serial interface, a parallel interface, or any other type of interface. The interface may be an universal serial bus (USB) standard 2.0 interface (a bi-directional 2-pin interface), a serial peripheral interface (SPI), a high speed inter-chip interface (HSIC), or any other type of interface. The printer control circuitry 110 is configured to communicate with the storage device 108 through the interface. The printer control circuitry 110 may also be configured to communicate with the host 104 through any type of communication channel either now known or later developed.

The storage device 108 may be any type of storage device. In an embodiment, the storage device 108 is non-volatile memory having pre-programmed data. The storage device 108 may be NAND flash memory, as an example.

The storage device 108 may be any size. In an embodiment, the storage device 108 has a storage capacity sufficient to support programmed instructions and available memory space for executing any of the functions/features discussed above and/or any other functions/features, either now known or later developed. In a version, the storage device 108 has a storage capacity of at least 1 gigabyte.

Figure 2:
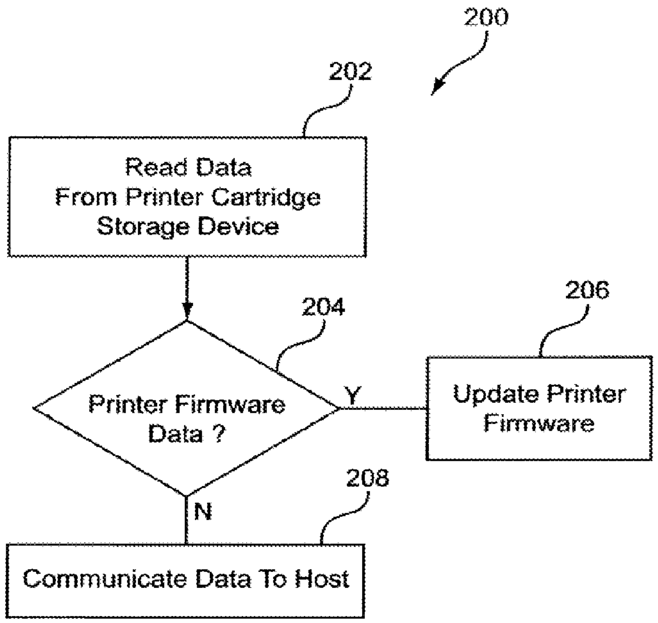
FIG. 2 is a flow diagram showing acts that may be executed by the printer control circuitry of FIG. 1.

FIG. 2 is a flow diagram showing acts 200 that may be executed by the printer control circuitry 110 to implement data from the storage device 108. When the printer cartridge 106 is installed in the printer, the printer control circuitry 110 reads the data from the storage device 108 (Act 202). The data may include data for use by the printer control circuitry 110 and/or data for communication to the host 104 (Act 204). Data for use by the printer control circuitry 110 is used to update the printer firmware (Act 206). Any other type of data may be communicated to the host 104 either when the cartridge is installed or at a later time (Act 208). Other data may include image and/or audio visual data, as discussed above, or any other type of data including data not directly associated with the printer. Data not directly associated with the printer may include program data, advertisement data, or other type of data. Program data may include a trial or full version of a word processor or photo editor, as examples, or any other type of program data.

Figure 3:
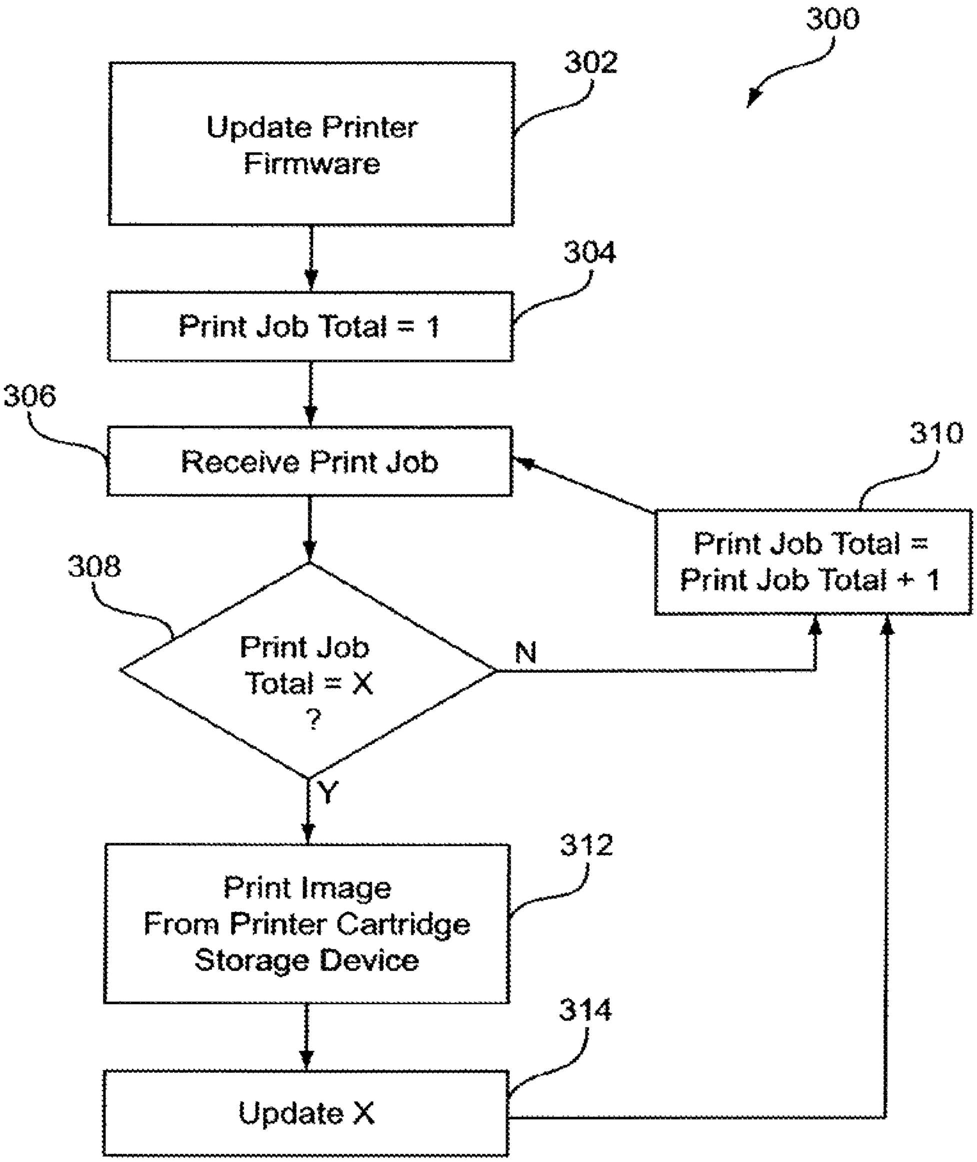
FIG. 3 is a flow diagram showing acts of an image printing feature that may be provided by the consumable printer cartridge of FIG. 1.

FIG. 3 is a flow diagram showing acts 300 that may be executed by the printer control circuit 110 to automatically print one or more images in predefined intervals. In the illustrated example, the predefined interval is based on a predetermined number of print jobs completed by the printer 102 (represented by "X"). When the printer cartridge 106 is installed in the printer, the printer control circuitry 110 reads the program data from the storage device 108 and updates the printer 102 firmware (Act 302). The printer firmware sets a print job total=1 (Act 304). The printer 102 receives a print job from the host (Act 306) and executes the print job. The printer firmware determines if the print job total is equal to X (Act 308). If the print job total is not equal to X, the print job total is incremented by one (Act 310). If the print job total is equal to X, an image(s) is retrieved from the storage device 108 and printed (Act 312). The image may be a third party advertisement, as an example, or any other type of image. The interval X is updated (Act 314) and the print job total is incremented by one (back to Act 310). An updated interval X may be based on a consistent or changing interval.

Figure 4:
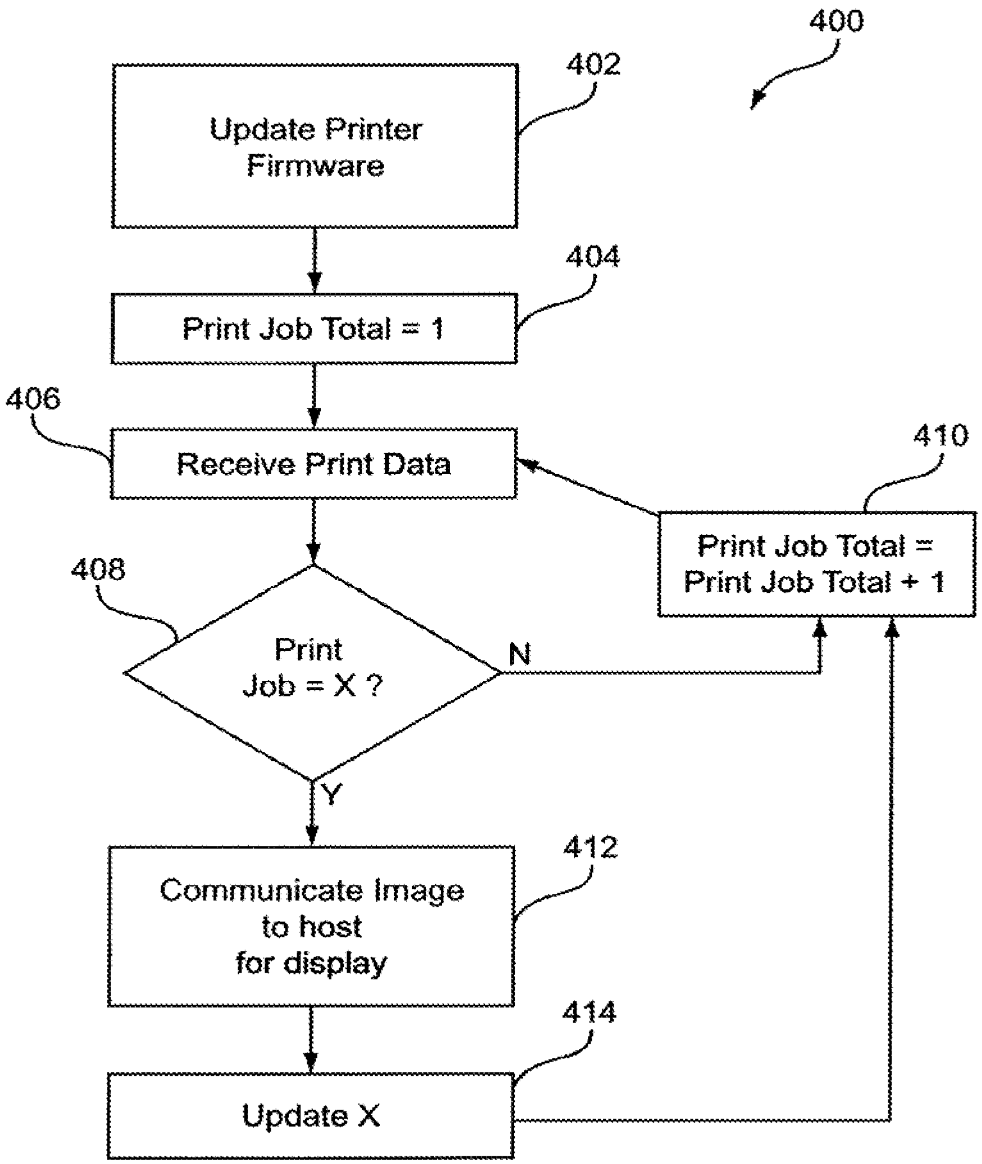
FIG. 4 is a flow diagram showing acts of a display feature that may be provided by the consumable printer cartridge of FIG. 1.

FIG. 4 is a flow diagram showing acts 400 that may be executed by the printer control circuit 110 to automatically display one or more images on the display 112 in predefined intervals. A predefined interval may be based on a predetermined number of print jobs completed by the printer 102 (represented by "X"). When the printer cartridge 106 is installed in the printer, the printer control circuitry 110 reads the program data from the storage device 108 and updates the printer 102 firmware (Act 402). The printer firmware sets a print job total=1 (Act 404). The printer 102 receives a print job from the host (Act 406) and executes the print job. The printer firmware determines if the print job total is equal to X (Act 408). If the print job total is not equal to X, the print job total is incremented by one (Act 410). If the print job total is equal to X, an image(s) is retrieved from the storage device 108 and communicated to the host 104 for display on the display 112 (Act 412). The image may be a third party advertisement, as an example, or any other type of image. The interval X is updated (Act 414) and the print job total is incremented by one (back to Act 410). An updated interval X may be based on a consistent or changing interval.

All of the discussion above, regardless of the particular implementation being described, is exemplary in nature, rather than limiting. Although specific components of the system 100 are described, methods, systems, and articles of manufacture consistent with the system 100 may include additional or different components. For example, components of the system 100 may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the system 100 may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system 100 may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

We claim:

1. A printer cartridge comprising:
a data storage device; and
an interface configured to communicate with a printer control circuit of a printer,
wherein the printer cartridge is configured to:
receive a communication, via the interface, from the printer control circuit in order to store image data in the data storage device;
responsive to the communication, store the image data in the data storage device, and
enable the printer control circuit to access the image data stored on the data storage device for a printer process executed by the printer control circuit to cause printing of the image data on a print medium.

2. The printer cartridge of claim 1, wherein the data storage is further configured to store advertisement data, the advertisement data including data for printing a first advertisement page.

3. The printer cartridge of claim 2, wherein the advertisement data includes data for use in determining an interval for printing a second advertisement page.

4. The printer cartridge of claim 3, wherein the interval is a predetermined number of printed pages.

5. The printer cartridge of claim 1, wherein the data storage is further configured to store advertisement data, the advertisement data including data for use in displaying an advertisement page on a display.

6. The printer cartridge of claim 1, wherein the data storage is further configured to store advertisement data, the advertisement data including audio data, video data, or audio/video data.

7. The printer cartridge of claim 1, wherein the data storage device includes data for disabling at least one printing feature if the printer cartridge is refilled.

8. The printer cartridge of claim 1, wherein the printer cartridge is an ink cartridge or a toner cartridge.

9. A method comprising:
installing a printer cartridge to be in communication with a printer, wherein the printer cartridge includes a data storage device;
receiving, via an interface of the printer cartridge, a communication from a printer control circuit of the printer requesting to store image data in the data storage device of the printer cartridge;
in response to receiving the communication via the interface, communicating with the printer control circuit to store image data in the data storage device of the printer cartridge, and
enabling the printer control circuit to access the image data stored on the data storage device for a printer process executed by the printer control circuit to cause printing of the image data on a print medium.

10. The method of claim 9, wherein the data storage is further configured to store advertisement data, the advertisement data including data for printing a first advertisement page.

11. The method of claim 10, wherein the advertisement data includes data for use in determining an interval for printing a second advertisement page.

12. The method of claim 11, wherein the interval is a predetermined number of printed pages.

13. The method of claim 9, wherein the data storage is further configured to store advertisement data, the advertisement data including data for use in displaying an advertisement page on a display.

14. The method of claim 9, wherein the data storage is further configured to store advertisement data, the advertisement data including audio data, video data, or audio/video data.

15. The method of claim 9, wherein the data storage device includes data for disabling at least one printing feature if the printer cartridge is refilled.

16. The method of claim 9, wherein the printer cartridge is an ink cartridge or a toner cartridge.

17. A method comprising:
installing a printer cartridge to be in communication with a printer, wherein the printer cartridge includes a storage device;
executing a printer function program;
receiving, via an interface of the printer cartridge, a communication from a printer control circuit of the printer requesting to store image data corresponding to the printer function program in the storage device of the printer cartridge; and
utilizing, by the printer, the storage device as an additional memory buffer by storing the image data corresponding to the printer function program in the storage device, and enabling the printer control circuit to access the image data stored on the data storage device for a printer process executed by the printer control circuit to cause printing of the image data on a print medium.

18. The method of claim 17, further comprising:
receiving update data for the printer function program at the printer control circuit from the storage device on the printer cartridge; and
modifying the printer function program based on the update data.

19. The method of claim 18, wherein modifying the printer function program comprises enabling the printer to execute a function not supported by the printer function program prior to modification.

20. The method of claim 17, further comprising:
receiving a print job; and
incrementing a count value based on the print job, wherein an advertisement that is stored in the storage device is outputted when the count value exceeds a predetermined value.

* * * * *